(12) United States Patent
Karlsson et al.

(10) Patent No.: US 9,091,191 B2
(45) Date of Patent: Jul. 28, 2015

(54) METHOD AND SYSTEM FOR DIESEL PARTICLE FILTER REGENERATION

(75) Inventors: Carl-Johan Karlsson, Strömstad (SE); Klas Telborn, Södertälje (SE)

(73) Assignee: SCANIA CV AB (SE)

( * ) Notice: Subject to any disclaimer, the term of this patent is extended or adjusted under 35 U.S.C. 154(b) by 59 days.

(21) Appl. No.: 13/814,541

(22) PCT Filed: Aug. 23, 2011

(86) PCT No.: PCT/SE2011/051008
§ 371 (c)(1),
(2), (4) Date: Feb. 28, 2013

(87) PCT Pub. No.: WO2012/030273
PCT Pub. Date: Mar. 8, 2012

(65) Prior Publication Data
US 2013/0152550 A1      Jun. 20, 2013

(30) Foreign Application Priority Data
Aug. 31, 2010   (SE) ..................... 1050888

(51) Int. Cl.
*F01N 3/023* (2006.01)
*F01N 3/10* (2006.01)
(Continued)

(52) U.S. Cl.
CPC .............. *F01N 3/023* (2013.01); *F01N 3/0231* (2013.01); *F01N 3/103* (2013.01); *F01N 3/106* (2013.01);
(Continued)

(58) Field of Classification Search
CPC ... F01N 3/0231; F01N 9/002; F01N 2430/08; F01N 2560/06; F01N 2560/08; F01N 2900/1602; F01N 2900/1606; F02D 41/0245; F02D 41/029; F02D 2200/0812; Y02T 10/26
USPC ........... 60/274, 285, 295, 297, 299, 300, 311, 60/320
See application file for complete search history.

(56) References Cited

U.S. PATENT DOCUMENTS

2003/0217549 A1 *  11/2003  Watanabe et al. ............... 60/285
2005/0039439 A1    2/2005  Kitahara ......................... 60/274
(Continued)

FOREIGN PATENT DOCUMENTS

| EP | 1 273 779 | 1/2003 |
|---|---|---|
| EP | 2 128 393 | 12/2009 |
| WO | WO 2008/083917 | 7/2008 |

OTHER PUBLICATIONS

International Search Report mailed Dec. 9, 2011 in corresponding PCT International Application No. PCT/SE2011/051008.

*Primary Examiner* — Thomas Denion
*Assistant Examiner* — Jorge Leon, Jr.
(74) *Attorney, Agent, or Firm* — Ostrolenk Faber LLP

(57) ABSTRACT

A method for regeneration of a particle filter (202) pertaining to a combustion process, which filter treats exhaust gases arising from combustion in a combustion engine (101): During regeneration, controlling the engine (101) according to a first mode and a second mode, in the first mode, the engine (101) is controlled such that a high exhaust temperature is generated, determining a temperature of the particle filter (202), and controlling the engine (101) according to the first mode when the temperature determined is below a first value until the temperature reaches a higher second value, and then controlling the engine in the second mode. The invention relates also to a system and a vehicle (100).

20 Claims, 6 Drawing Sheets

(51) Int. Cl.
*F01N 9/00* (2006.01)
*F02D 41/02* (2006.01)
*F02D 41/14* (2006.01)
*F02D 41/40* (2006.01)
*F01N 13/00* (2010.01)
*F01N 3/20* (2006.01)
*F02B 37/00* (2006.01)

(52) U.S. Cl.
CPC ............ *F01N 9/002* (2013.01); *F01N 13/0097* (2014.06); *F02D 41/029* (2013.01); *F02D 41/0245* (2013.01); *F02D 41/1448* (2013.01); *F02D 41/401* (2013.01); *F01N 3/2066* (2013.01); *F01N 2430/08* (2013.01); *F01N 2430/085* (2013.01); *F01N 2560/06* (2013.01); *F01N 2560/08* (2013.01); *F01N 2560/14* (2013.01); *F01N 2900/0408* (2013.01); *F01N 2900/0601* (2013.01); *F01N 2900/1402* (2013.01); *F01N 2900/1602* (2013.01); *F01N 2900/1606* (2013.01); *F02B 37/00* (2013.01); *F02D 41/405* (2013.01); *F02D 2200/0802* (2013.01); *F02D 2200/0812* (2013.01); *Y02T 10/26* (2013.01); *Y02T 10/44* (2013.01); *Y02T 10/47* (2013.01)

(56) References Cited

U.S. PATENT DOCUMENTS

| 2005/0172613 | A1* | 8/2005 | Blomquist | 60/274 |
| 2007/0144148 | A1  | 6/2007 | Colignon  | 60/286 |
| 2008/0134669 | A1  | 6/2008 | Lange     | 60/295 |
| 2011/0023462 | A1* | 2/2011 | Kurtz et al. | 60/286 |
| 2011/0146246 | A1* | 6/2011 | Farman et al. | 60/286 |

* cited by examiner

METHOD AND SYSTEM FOR DIESEL PARTICLE FILTER REGENERATION

CROSS-REFERENCE TO RELATED APPLICATIONS

The present application is a 35 U.S.C. §§371 national phase conversion of PCT/SE2011/051008, filed Aug. 23, 2011, which claims priority of Swedish Patent Application No. 1050888-5, filed Aug. 31, 2010, the contents of which are incorporated by reference herein. The PCT International Application was published in the English language.

FIELD OF THE INVENTION

The present invention relates to particle filters and in particular to a method for regeneration of particle filters. The invention relates also to a system and a vehicle.

BACKGROUND TO THE INVENTION

Growing official concern about pollution and air quality, especially in urban areas, has led to the adoption of emission standards and rules in many jurisdictions.

Such emission standards often set requirements which define acceptable limits for exhaust discharges from vehicles equipped with combustion engines. These standards often regulate, for example, levels of discharge of nitrogen oxides ($NO_x$), hydrocarbons (HC), carbon monoxide (CO) and particles from most types of vehicles.

The endeavour to meet such emission standards has led to ongoing research with a view to reducing emissions by means of post-treatment (cleaning) of the exhaust gases which arise from combustion in a combustion engine.

One way to post-treat exhaust gases from a combustion engine is a so-called catalytic cleaning process, so vehicles, including large means of transport powered by combustion engines, are usually also provided with at least one catalyst.

Post-treatment systems may also, either alternatively or in combination with one or more catalysts, comprise other components, e.g. particle filters. There are also cases where particle filters and catalysts are integrated with one another.

Combustion of fuel in the cylinders of a combustion engine results in the formation of soot particles. Particle filters are used to capture these soot particles, and work in such a way that the exhaust flow is led through a filter structure whereby soot particles are captured from the passing exhaust flow and are stored in the particle filter.

The particle filter fills with soot progressively during vehicle operation, and has to be emptied of it sooner or later, which is usually achieved by so-called regeneration.

Regeneration involves the soot particles, which mainly consist of carbon particles, being converted to carbon dioxide and/or carbon monoxide in one or more chemical processes, and may in principle be effected in two different ways. One way is regeneration by so-called oxygen ($O_2$) based regeneration, also called active regeneration. In active regeneration, carbon is converted by oxygen to carbon dioxide and water.

This chemical reaction requires relatively high particle filter temperatures for desired reaction rates (filter emptying rates) to be achieved at all.

Instead of active regeneration, it is possible to apply $NO_2$ based regeneration, also called passive regeneration. In passive regeneration, nitrogen oxide and carbon monoxide are formed by a reaction between carbon and nitrogen dioxide. The advantage of passive regeneration is that desired reaction rates, and hence the rate at which the filter is emptied, can be achieved at significantly lower temperatures.

Irrespective of whether active or passive regeneration is applied, it is nevertheless important that it be conducted in an effective way so that regeneration of a particle filter can be done within a reasonable time.

SUMMARY OF THE INVENTION

An object of the present invention is to propose a method for regenerating particle filters in an effective way. This object is achieved by a method according to the invention.

The present invention relates to a method for passive regeneration of a particle filter pertaining to a combustion process and adapted to treat exhaust gases arising from combustion in a combustion engine, which method comprises, during said regeneration, said engine being controlled according to a first mode and a second mode, in which first mode the engine is controlled in such a way that a high exhaust temperature is generated. The method further comprises determining a temperature for said particle filter and controlling said engine according to said first mode when said temperature determined is below a first value.

The present invention affords the advantage that a high exhaust temperature is achieved, thereby raising the temperature of the particle filter. Since the regeneration rate is temperature-dependent, this means that a high regeneration rate can be achieved.

The engine may be controlled according to the first mode until the temperature of the particle filter reaches a higher second temperature at which control of the engine may switch to the second mode in which the engine may be controlled in such a way that a substantially larger amount of nitrogen oxides is delivered than in the first mode. Since the regeneration rate in passive regeneration depends both on temperature and on access to nitrogen oxides (nitrogen dioxide) the regeneration rate can therefore be raised further.

The second temperature may be a suitable temperature exceeding 250° C.

When the particle filter has reached the second temperature and the engine has switched to the second mode, the engine may be controlled according to the second mode until the temperature determined drops so low that it needs to be raised again to prevent the regeneration rate from becoming too low, e.g. below 500° C. Instead of switching back to the first mode when the temperature has dropped to the lower level, switching to the first mode may instead be effected when a certain time has passed since the change to the second mode took place.

Said mode change may be repeated until said particle filter has been regenerated to a desired level or until the regeneration has to be discontinued for some reason.

In the first mode, the efficiency of the engine may be lowered to a low level such that a large part of the energy changes to heat. This may for example be achieved by injecting fuel after the piston has passed top dead centre and is therefore moving down. The injection time (injection angle) may for example be controlled in such a way that the fuel is in principle ignited but makes no substantial contribution to generation of power for propelling the vehicle. The engine may also be controlled towards a low value, i.e. towards low air supply, in order to reduce the air's cooling effect.

Further characteristics of the present invention and advantages thereof are indicated by the detailed description set out below of embodiment examples and the attached drawings.

DETAILED DESCRIPTION OF PREFERRED EMBODIMENTS

Figure 1A:
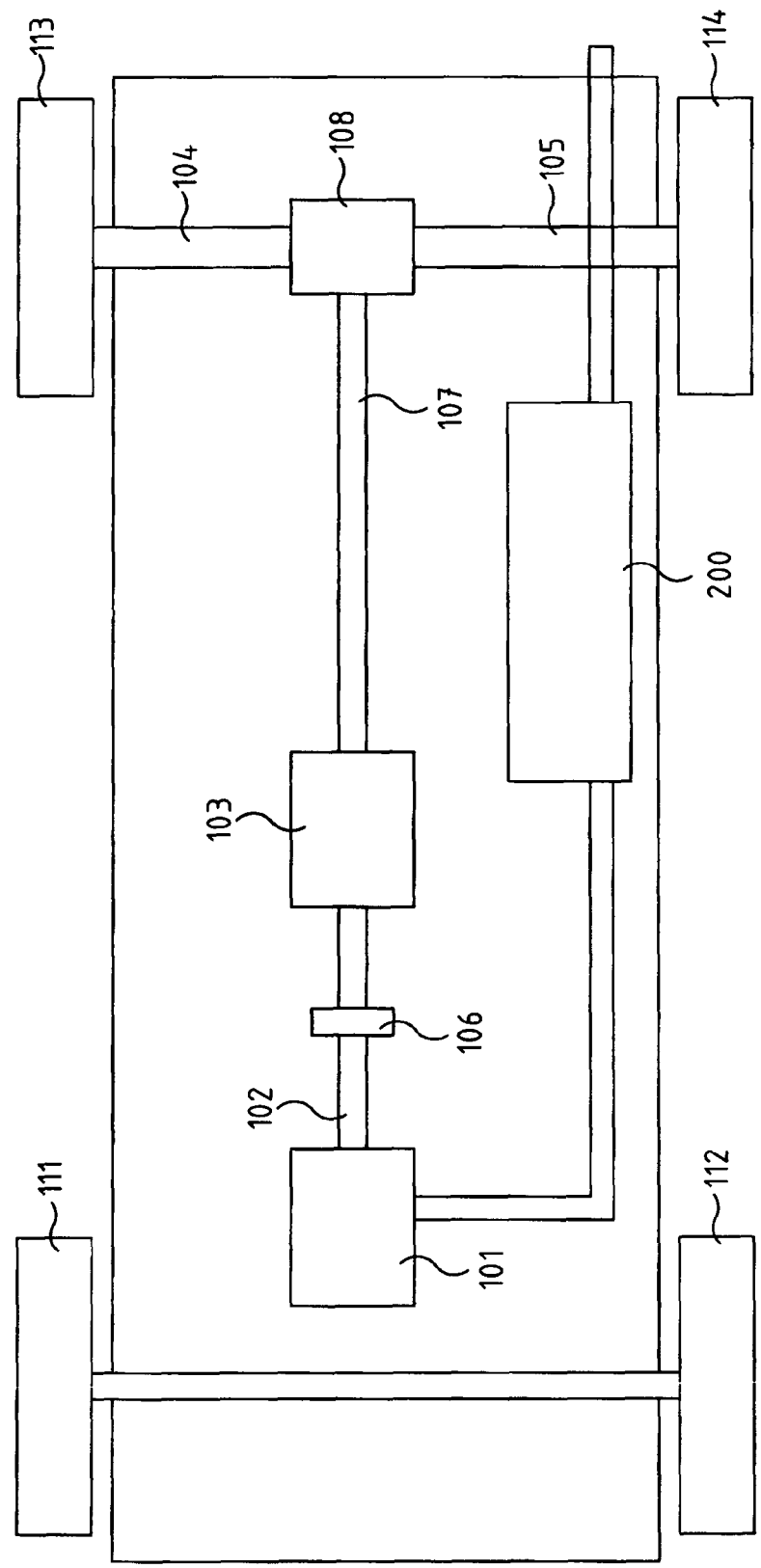
FIG. 1a depicts a power train of a vehicle in which the present invention may be used advantageously.

FIG. 1a depicts schematically a heavy vehicle 100, e.g. a truck, bus or the like, according to an example of an embodiment of the present invention. The vehicle 100 schematically depicted in FIG. 1a comprises a pair of forward wheels 111, 112 and a pair of powered rear wheels 113, 114. The vehicle further comprises a power train with a combustion engine 101 connected in a conventional way, by an output shaft 102 of the engine 101, to a gearbox 103, e.g. via a clutch 106.

An output shaft 107 from the gearbox 103 drives the powered wheels 113, 114 via a final gear 108, e.g. a conventional differential, and driveshafts 104, 105 which are connected to said final gear 108.

The vehicle 100 further comprises a post-treatment (exhaust cleaning) system 200 for treatment (cleaning) of exhaust discharges from the engine 101.

Figure 2:
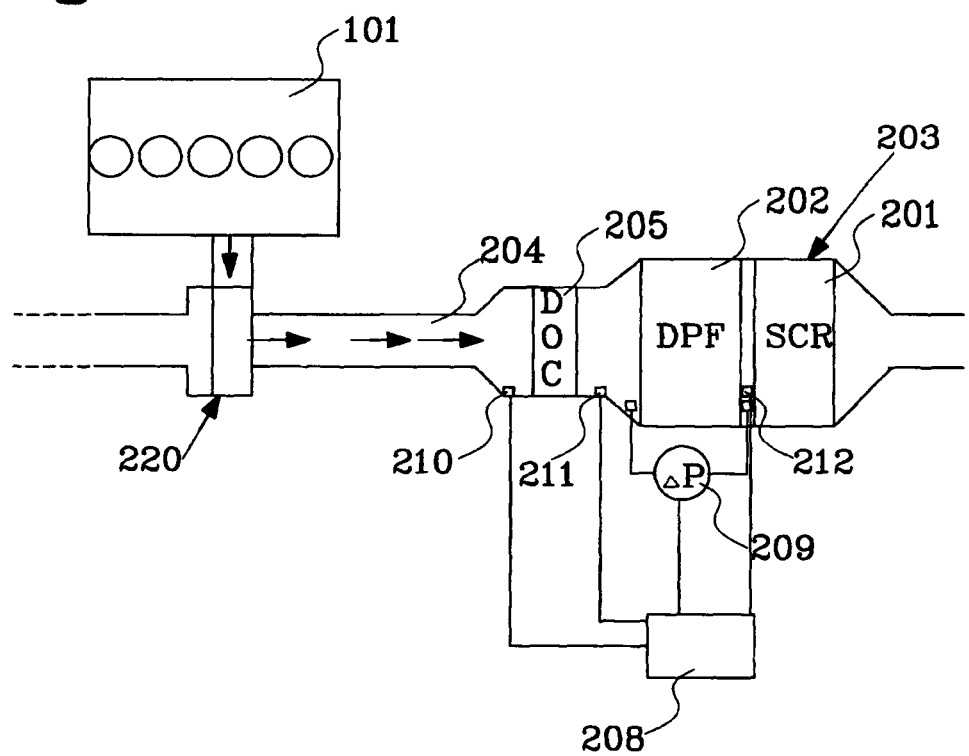
FIG. 2 depicts an example of a post-treatment system of a vehicle in which the present invention may be used advantageously.

The post-treatment system is depicted in more detail in FIG. 2. The diagram illustrates the engine 101 of the vehicle 100, in which the exhaust gases generated by the combustion are led via a turbo unit 220 (in turbo engines the exhaust flow arising from the combustion often drives a turbo unit used to compress the incoming air for the combustion in the cylinders). The function of turbo units is very well known and is therefore not described in more detail here. The exhaust flow is then led via a pipe 204 (indicated by arrows) to a particle filter (diesel particulate filter, DPF) 202 via an oxidation catalyst (diesel oxidation catalyst, DOC) 205.

The post-treatment system further comprises an SCR (selective catalytic reduction) catalyst 201 situated downstream of the particle filter 202. SCR catalysts use ammonia ($NH_3$), or a compound from which ammonia can be generated/formed, as additive for reducing the amount of nitrogen oxides $NO_R$.

The particle filter 202 may alternatively be situated downstream of the SCR catalyst 201, although this may be less advantageous in cases where the present invention relates to so-called passive regeneration which is dependent on the nitrogen oxides which are usually reduced by the SCR catalyst. According to an embodiment of the present invention, the post-treatment system does not comprise an SCR catalyst at all.

The oxidation catalyst DOC 205 has several functions and utilises the surplus air to which the diesel engine process generally gives rise in the exhaust flow as a chemical reagent in conjunction with a noble metal coating in the oxidation catalyst. The oxidation catalyst is normally used primarily to oxidise remaining hydrocarbons and carbon monoxide in the exhaust flow to carbon dioxide and water.

The oxidation catalyst may however also oxidise to nitrogen dioxide ($NO_2$) a large proportion of the nitrogen monoxides (NO) present in the exhaust flow. This nitrogen dioxide is then utilised in passive regeneration according to the present invention. Further reactions may also take place in the oxidation catalyst.

In the embodiment depicted, DOC 205, DPF 202 and also the SCR catalyst 201 are integrated in a combined exhaust cleaning unit 203. It should however be noted that DOC 205 and DPF 202 need not be integrated in a combined exhaust cleaning unit but may instead be arranged in some other way found appropriate. For example, DOC 205 may be situated nearer to the engine 101. The SCR catalyst may likewise be separate from DPF 202 and/or DOC 205.

The post-treatment system set-up depicted in FIG. 2 usually occurs in heavy vehicles, at least in jurisdictions where stringent emission requirements apply, but as an alternative to the oxidation catalyst the particle filter may instead be provided with noble metal coatings so that the chemical processes which would occur in the oxidation catalyst occur instead in the particle filter, in which case the post-treatment system therefore has no DOC.

As previously mentioned, the combustion in the engine 101 results in the formation of soot particles. These soot particles need not, and are in many cases not allowed to, be discharged into the surroundings of the vehicle. Diesel particles consist of hydrocarbons, carbon (soot) and inorganic substances such as sulphur and ash. As mentioned above, these soot particles are therefore captured by the particle filter 202, which works in such a way that the exhaust flow is led through a filter structure in which soot particles are captured from the passing exhaust flow in order to be stored in the filter 202. A very large proportion of the particles may be separated from the exhaust flow by the filter 202.

The particles thus separated from the exhaust flow therefore accumulate in the particle filter 202, causing it to fill with soot over time. Depending on factors such as current driving conditions, the driver's mode of driving and the vehicle's load, a larger or smaller amount of soot particles will be generated, so this filling will take place more or less quickly, but when the filter reaches a certain level of filling it needs "emptying". If the filter is full to too high a level, the vehicle's performance may be affected and there may also be fire hazards due to soot accumulation in combination with high temperatures.

As above, emptying the particle filter 202 is done by regeneration whereby soot particles, carbon particles, are converted in a chemical process to carbon dioxide and/or carbon monoxide. Over time the filter 202, therefore, has to be regenerated at more or less regular intervals, and determining suitable times for its regeneration may for example be by means of a control unit 208 which may for example determine a suitable time or times at least partly on the basis of signals from a pressure sensor 209 which measures the differential pressure across the filter. The fuller the filter 202 becomes, the higher the pressure difference across it will be.

Determination of regeneration timing may also be affected by current temperatures before and/or after the oxidation catalyst 205 and/or before and/or after the filter 202. These temperatures may for example be determined by means of temperature sensors 210-212.

No regeneration action is normally taken so long as the filter's filling level remains below some predetermined level. For example, the control system's control of filter regeneration may be so arranged that no action is taken so long as the degree of filling is for example below some suitable level within the range 60-80%. The degree of filling may be estimated in any suitable way, e.g. on the basis of differential pressure as above, in which case a certain pressure difference will represent a certain degree of filling.

The control unit 208 also controls the regeneration process according to the present invention, as described in more detail below.

Generally, control systems in modern vehicles usually comprise a communication bus system consisting of one or more communication buses for connecting together a number of electronic control units (ECUs), or controllers, and various components located on the vehicle. Such a control system may comprise a large number of control units, and the responsibility for a specific function may be divided among two or more of them.

For the sake of simplicity, FIG. 2 depicts only the control unit 208, but vehicles of the type depicted often have a relatively large number of control units, e.g. for control of engine, gearbox etc., as is well known to specialists within the technical field.

The present invention may be implemented in the control unit 208 but may also be implemented wholly or partly in one or more other control units with which the vehicle is provided.

Control units of the type depicted are normally adapted to receiving sensor signals from various parts of the vehicle, e.g., as depicted in FIG. 2, said pressure sensor 209 and temperature sensors 210-212, and also, for example, an engine control unit (not depicted). The control signals generated by control units normally depend also both on signals from other control units and on signals from components. For example, the control exercised by the control unit 208 over regeneration according to the present invention may for example depend on information received from, for example, the engine control unit and the temperature/pressure sensors depicted in FIG. 2.

Control units of the type depicted are also usually adapted to deliver control signals to various parts and components of the vehicle, e.g. in the present example to the engine control unit to demand/order control of the engine's combustion as below.

The control is often governed by programmed instructions. These instructions typically take the form of a computer programme which, when executed in a computer or control unit, causes the computer/control unit to effect desired forms of control action, e.g. method steps according to the present invention. The computer programme usually takes the form of a computer programme product 109 which is stored on a digital storage medium 121 (see FIG. 1b), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behaviour in a specific situation may thus be adjusted by altering the computer programme's instructions.

Figure 1B:
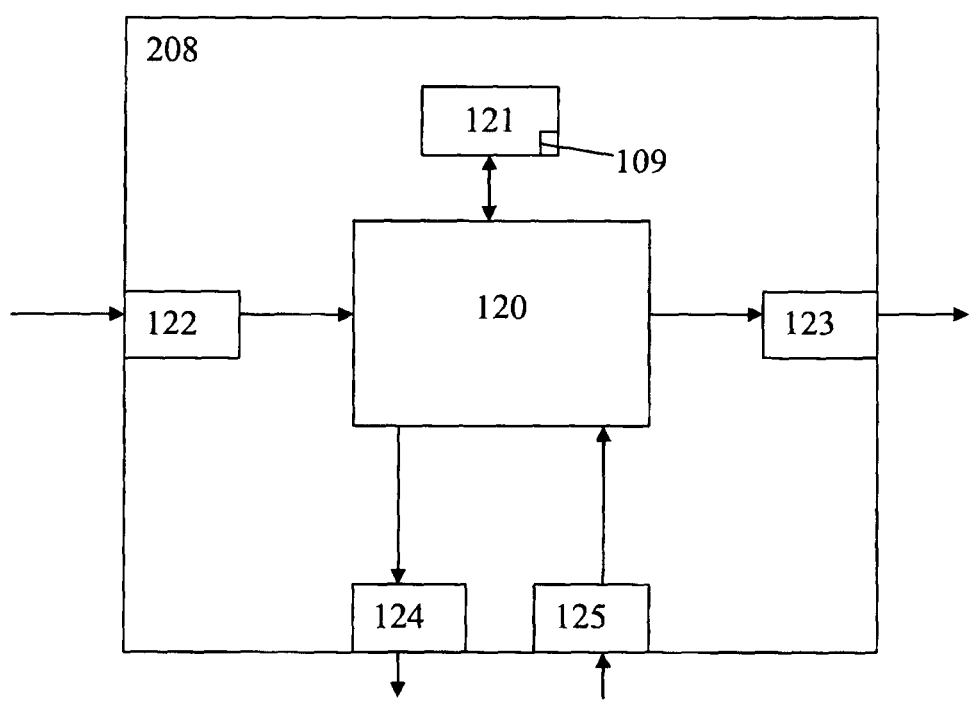
FIG. 1b depicts an example of a control unit in a vehicle control system.

An example of a control unit (the control unit 208) is depicted schematically in FIG. 1b, which control unit 208 may, in turn, comprise a calculation unit 120 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit 121 which provides it with, for example, the stored programme code 109 and/or the stored data which the calculation unit 120 needs for it to be able to perform calculations. The calculation unit 120 is also arranged to store partial or final results of calculations in the memory unit 121.

The control unit 208 is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 120 can process.

These signals are thereafter conveyed to the calculation unit 120. The output signal sending devices 123, 124 are arranged to convert signals received from the calculation unit 120 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, a MOST (Media Orientated Systems Transport) bus or some other bus configuration, or a wireless connection.

As above, regeneration may in principle be effected in two different ways. One way is by so-called oxygen ($O_2$) based regeneration, also called active regeneration. In active regeneration a chemical process takes place substantially as follows:

$$C + O_2 = CO_2 + \text{heat} \qquad \text{(eq. 1)}$$

Active regeneration thus converts carbon plus oxygen gas to carbon dioxide plus heat. However, this chemical reaction is very temperature-dependent and requires relatively high filter temperatures for acceptable reaction rates to be achieved at all. A lowest filter temperature of 500° C. is typically required, but a still higher temperature is preferable for regeneration to take place at desired rates.

However, the maximum temperature usable in active regeneration is often limited by tolerances of the components concerned. For example, the particle filter 202 and/or any downstream SCR catalyst often have design limitations with regard to the maximum temperature to which they may be subjected. This means that active regeneration may, owing to components affected, be subject to an unacceptably low maximum permissible temperature. At the same time, a very high lowest temperature is therefore required for usable reaction rates to be achieved at all. In active regeneration, the soot load in the particle filter 202 is normally burnt substantially completely. After total regeneration of the particle filter, its soot level will be substantially 0%.

It is now increasingly common that vehicles are equipped not only with particle filters 202 but with SCR catalysts 201, in which case active regeneration may entail problems in the form of overheating of the downstream SCR catalyst treatment process.

At least partly for this reason, the present invention applies $NO_2$ based (passive) regeneration instead of the active regeneration described above. In passive regeneration, nitrogen oxides and carbon oxides are formed in a reaction between carbon and nitrogen dioxide as follows:

$$NO_2 + C = NO + CO \qquad \text{(eq. 2)}$$

The advantage of passive regeneration is that desired reaction rates, and hence the rate at which the filter is emptied, are achieved at lower temperatures. Passive regeneration of particle filters typically takes place at temperatures within the range 200° C.-500° C., although temperatures in the upper part of this range are normally preferable. This temperature range, which is substantially lower than in active regeneration, is nevertheless a great advantage in cases in which, for example, there are SCR catalysts, since it entails no risk of reaching such a high temperature level as to cause risk of damage to the SCR catalyst.

Figure 3:
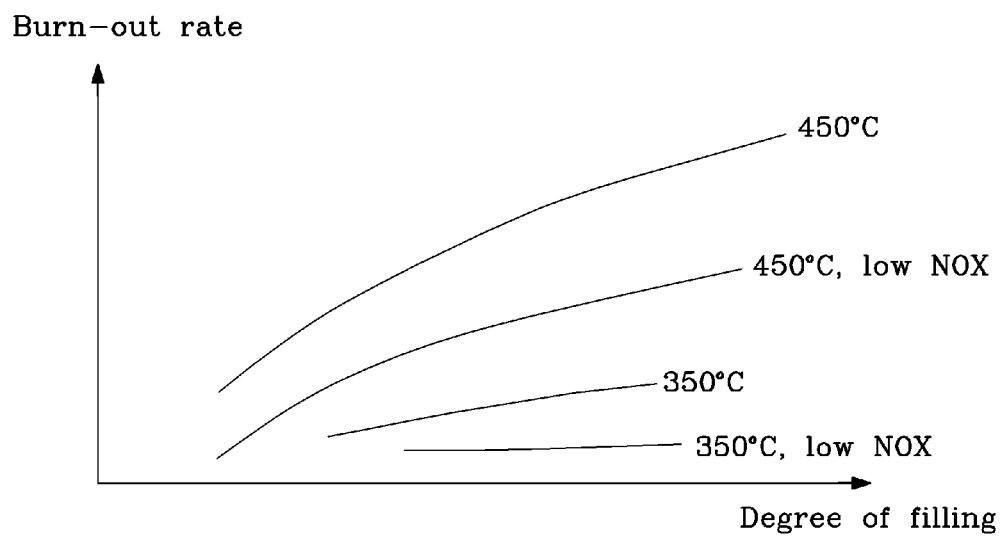
FIG. 3 depicts an example of regeneration rate (soot burnout rate) as a function of amounts of soot in the particle filter, and its temperature dependency.

FIG. 3 depicts an example of regeneration rate (soot burn-out rate) as a function of amounts of soot in the particle filter 202 in operating situations at two different temperatures (350° C. and 450° C.). The regeneration rate is also exemplified for respective low and high concentrations of nitrogen dioxide. As may be seen in the diagram, the burn-out rate is low at low temperature (350° C.) and low concentration of nitrogen dioxide. The temperature dependency of the regeneration rate is clearly indicated by the burn-out rate being relatively low even at high concentrations of nitrogen dioxide so long as the filter temperature is low. Burn-out rates are substantially higher at 450° C. even in the case of low concentration of nitrogen dioxide, although high contents of nitrogen dioxide are obviously preferable.

However, passive regeneration depends not only on filter temperature and amount of soot as in FIG. 3 but also, as indicated by equation 2 above and FIG. 3, on access to nitrogen dioxide. However, the proportion of nitrogen dioxide ($NO_2$) to the total amount of nitrogen oxides ($NO_x$) generated by the engine's combustion is normally only about 0-10%. When the engine is under heavy load, the proportion of $NO_2$ may be as low as 2-4%. With the object of achieving rapid regeneration of the filter, it is therefore desirable that the proportion of nitrogen dioxide in the exhaust flow entering the filter be as high as possible.

It is therefore desirable to increase the amount of nitrogen dioxide $NO_2$ in the exhaust flow arising from the engine's combustion. There are several different ways of effecting this conversion, and it may be achieved by means of the oxidation catalyst 205, in which nitrogen oxide can be oxidised to nitrogen dioxide.

Figure 4:
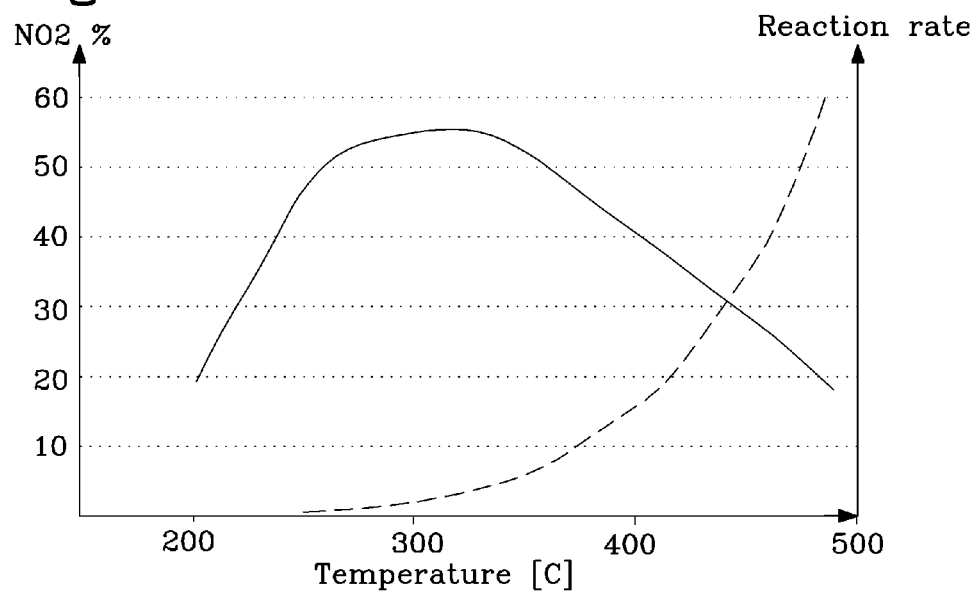
FIG. 4 depicts the temperature dependency of oxidation of nitrogen oxide to nitrogen dioxide in an oxidation catalyst.

However, oxidation of nitrogen oxide to nitrogen dioxide in the oxidation catalyst is also a very temperature-dependent process, as exemplified in FIG. 4. As may be seen in the diagram, it is possible at favourable temperatures for the proportion of nitrogen dioxide to the total amount of nitrogen oxides in the exhaust flow to be increased to nearly 60%. As the diagram also shows, a temperature of the order of 250-350° C. would therefore be optimum in passive regeneration for achieving as much oxidation of nitrogen oxide to nitrogen dioxide as possible.

As described in relation to equation 2 and FIG. 3, however, a completely different temperature situation applies to the actual burn-out process. This temperature situation is represented by a broken line in FIG. 4 and, as may be seen, the reaction rate may be regarded as substantially non-existent at particle filter temperatures below 200-250°. It should however be noted that the temperature indications referred to are merely examples and that actual values may differ from them. For example, the way in which the temperatures are determined/calculated might affect the temperature limits. Some ways of determining the filter temperature are exemplified below.

If there is free access to nitrogen dioxide, as high a filter temperature as possible would therefore be preferable. As may also be seen in FIG. 4, however, this leads to low oxidation of nitrogen oxide to nitrogen dioxide, which means that regeneration will be limited by shortage of nitrogen dioxide. Another aspect which further indicates the difficulty of determining optimum regeneration temperatures is the fact that the relation between the amount of nitrogen oxide generated by the engine's combustion and the resulting exhaust temperature is such that high nitrogen oxide content results in lower exhaust temperatures and consequently low regeneration rates.

The object of the present invention is therefore to achieve a satisfactory regeneration rate in passive regeneration. This is achieved in the present invention by switching the way in which the engine is controlled between at least two different modes. As mentioned above, a primary requirement for burning of soot in as effective a way as possible is a high temperature. For this reason, the engine is controlled according to a first mode when the particle filter temperature is below a first value. In the first mode the engine is controlled in such a way as to achieve a high or even maximised exhaust temperature.

This is done by lowering the engine's efficiency to a low level so that a large part of the energy changes to heat. A low efficiency is achieved by the fuel being injected late in the combustion cycle, after the piston has passed top dead centre and is therefore moving down. This means that the fuel supplied contributes less to generation of crankshaft torque and does instead to a larger extent merely burn and thereby generate heat. The injection time (injection angle) may be controlled in such a way that the fuel is in principle ignited but does not make a particularly large contribution to generation of power for propelling the vehicle. The engine is also controlled towards low $\lambda$ values, i.e. towards low air supply in order to reduce the cooling effect which occurs when large amounts of air (high $\lambda$ values) are used in the combustion.

Thus in the first mode the exhaust may reach a high temperature and therefore warm the post-treatment system as it passes through it. The first mode may be maintained until the filter temperature T reaches a second limit, e.g. of the order of 375° C.

Figure 5:
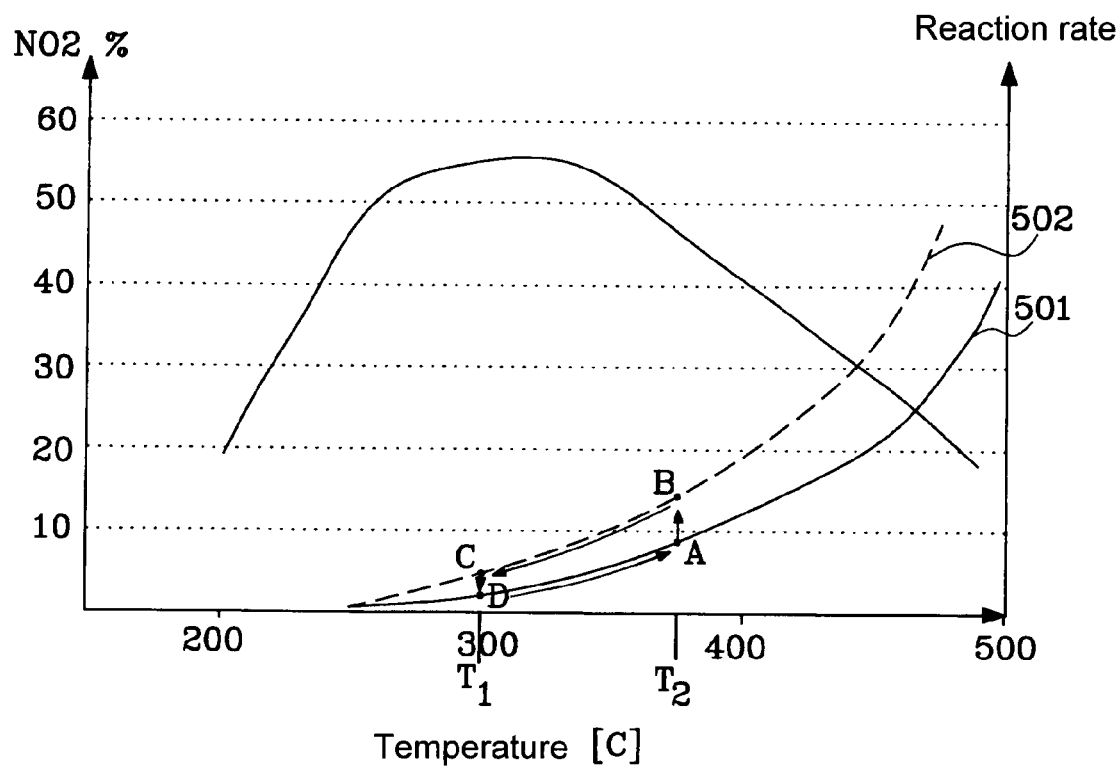
FIG. 5 is a schematic diagram of an example of a regeneration method according to the present invention.
Figure 6:
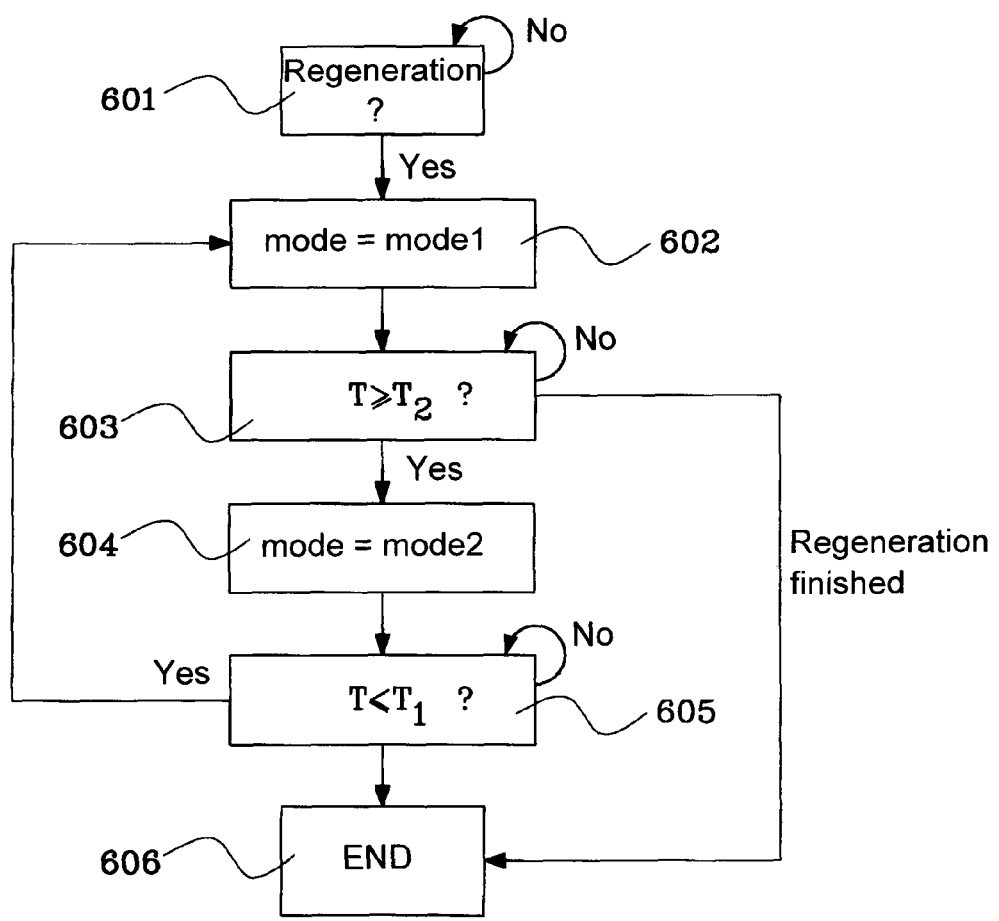
FIG. 6 is a schematic illustration of an example of a method according to the present invention.

An example of a method according to the present invention is illustrated in FIG. 5 and FIG. 6. In FIG. 6 the method starts at step 601, which determines whether regeneration is to take place. If so, the method goes on to step 602, in which the engine is controlled according to said first mode, and the method moves on to step 603 and stays there until the filter temperature T reaches a limit $T_2$. This is also illustrated in FIG. 5, in which the engine is controlled according to said first mode along the line 501 until the temperature reaches $T_2$ at point A. Although running the engine at low efficiency (high exhaust temperature) results in low nitrogen oxide contents in the exhaust gases, the regeneration rate (partly depending on the degree of filling of the particle filter) in the case of high temperature and low nitrogen dioxide content will in general, as illustrated in FIG. 3, become better than in the case of low temperature and high nitrogen oxide content. The temperature dependency of the regeneration rate is also exemplified in FIG. 5 by the lines 501, 502 which indicate respective regeneration rates at a certain $NO_x$ content of the exhaust gases.

The exhaust temperature and hence the increase in filter temperature depend not only on the engine's efficiency but also on its current load, so this too may be maximised. Equation 3 describes the engine's torque relationship $$M_{vev} = M_{ind} - M_{gas} - M_{frikt} - M_{agg} \quad \text{(eq. 3)}$$

in which $M_{ind}$ is the total torque generated by the engine's combustion.

$M_{vev}$ is the torque generated on the crankshaft, i.e. the resulting propulsive torque. This torque is controlled by current driving conditions and is therefore the torque achieved when the vehicle is to be driven in a desired way.

$M_{gas}$ is the pumping work, i.e. the braking torque to which the engine is subject by resistance in the exhaust flow. This braking torque may be increased by, for example, an exhaust brake whereby constriction of the exhaust flow will result in a braking torque.

$M_{frikt}$ represents the engine frictions, which are fairly constant and cannot be influenced.

$M_{agg}$ is the braking torque generated by the ancillaries with which the vehicle is usually fitted and which are driven by the engine and therefore take power away from its propulsion. Cooling units etc. are examples of such ancillaries. Controlling these ancillaries in such a way that they exert high or maximum load upon the engine increases the torque which has to be generated by the combustion for a desired crankshaft torque $M_{vev}$ and hence a desired vehicle speed to be maintained.

Thus the magnitude of $M_{ind}$ is influenced not only by the engine's efficiency but also by increasing load as above. Increasing $M_{gas}$ and $M_{agg}$ (which work against the propulsive torque achieved $M_{vev}$) may thus force the engine to work harder and consequently deliver hotter exhaust gases, thereby more quickly raising the particle filter's temperature to $T_2$.

When the particle filter reaches $T_2$ the present invention switches the way in which the engine is controlled to a second mode, step 604 in FIG. 6, whereby the engine is controlled in such a way that the amount of $NO_x$ delivered from the combustion increases. As explained above, the filter regeneration rate increases with the amount of available nitrogen oxides, so switching to the second mode will raise the filter regeneration rate. This is also illustrated in FIG. 5 by the broken line 502, which represents the regeneration rate at the amount of nitrogen oxide generated in the second mode.

Thus the working point of the regeneration at the mode change will shift from the continuous line to the broken line. In the example depicted, the working point of the regeneration changes from A to B in FIG. 5. As may be seen, this means that the regeneration rate will rise to a still higher level (at point B). Regeneration according to said second mode may then be maintained, step 605 in FIG. 6, until the filter temperature drops to T1, e.g. 300° C., at which the working point of the regeneration is thus at point C in the diagram, where switching back to the first mode takes place, back to step 602 in FIG. 6, and hence the continuous curve 501, at point D, in order to raise the filter's temperature again to point A for another switch to said second mode, with consequent change to point B. The temperature T1 to which the filter is allowed to drop without reverting to said first mode may be any suitable temperature. It may for example be chosen such that switching between said modes, and consequently switching of engine control parameters, will not take place too often. For example, the temperature T1 may be chosen such that mode change does not take place more often than every tenth second, every fifteenth second, every thirtieth second, once per minute or at some other suitable interval.

The temperature $T_1$ may also be arranged to depend on current engine load, i.e. $T_1$ may have one value at high engine load and another at low engine load. It is also possible to have model-based control of both $T_2$ and $T_1$ so that either or both of these temperatures vary continually on the basis of parameters such as current need for propulsive power etc.

The method depicted in FIG. 5 is then repeated until the regeneration is deemed completed, i.e. by the differential pressure having dropped to a desired level or by the regeneration having to be discontinued for some reason. This is also indicated in FIG. 6, in which the waiting steps 603, 605 are discontinued when regeneration is complete, whereupon the method ends at step 606.

It is generally the case that the higher the efficiency of the combustion the greater the amount of nitrogen oxides. However, high efficiency entails lower exhaust temperatures (smaller losses), which leads over time to lowering of the particle filter's temperature. High efficiency also means that large amounts of air are supplied to the cylinders and hence to the exhaust flow, resulting in quicker cooling of the particle filter by the relatively cold air. A balance therefore needs to be struck when choosing operating points for said second mode, since it is not certain that maximum efficiency, with maximum amounts of nitrogen oxides generated, is the most optimum solution, since it results in rapid cooling. A preferred embodiment of the present invention therefore uses a working point at which a substantially larger amount of nitrogen oxides is generated than in said first mode but at the same time a high exhaust temperature level is as far as possible maintained. For example, the working point in said second mode may be arranged to generate 50-400% more nitrogen oxides than in said first mode.

Thus an embodiment may apply engine control whereby in the first mode fuel is injected at a later time and/or injection angle during combustion in order to achieve a higher exhaust temperature at lower efficiency than by injecting fuel during operation in the second mode, which would conversely result in a higher proportion of $NO_x$ at a higher efficiency.

There are various ways of determining the filter temperature applied in the regulation described above. In the embodiment depicted in FIG. 2, a first temperature sensor 210 is situated upstream of the oxidation catalyst 205. A second temperature sensor 211 is situated downstream of the oxidation catalyst (upstream of the particle filter), and a third temperature sensor 212 is situated downstream of the particle filter 202. The filter temperature may for example be determined on the basis of the average of the temperatures measured by the sensors 211, 212. Alternatively, only the temperature from sensor 211 or 212 may be used. Similarly, some other suitable temperature sensor may be used, e.g. the sensor 210, which calculates a filter temperature in conjunction with a model of the post-treatment system, e.g. in conjunction with current exhaust flow.

The present invention is exemplified above in relation to vehicles. The invention is also applicable, however, to any means of transport in which the exhaust cleaning system as above is applicable, e.g. watercraft or aircraft with combustion processes/regeneration processes as above.

The invention claimed is:

1. A method for regeneration of a particle filter for a combustion process, wherein the filter is configured to treat exhaust gases arising from combustion in a combustion engine, the method comprising:
    determining a temperature for the particle filter;
    determining that an active regeneration operation is necessary for the particle filter, based on the soot level in the particle filter reaching a predetermined level;
    executing the active regeneration operation when the soot level in the particle filter reaches the predetermined level;
    wherein the active regeneration operation comprises controlling the engine according to a first regeneration mode when the temperature determined is below a selected first value, whereby the engine is to generate a high exhaust temperature until the temperature of the particle filter determined reaches a selected second value which is higher than the first value, whereupon, when the temperature of the particle filter is determined to have reached the second value, control of the engine is changed to a second regeneration mode whereby the engine is controlled to deliver a substantially larger amount of nitrogen oxides than in the first regeneration mode.

2. A method according to claim 1, wherein the second value is a selected temperature exceeding 250° C.

3. A method according to claim 1, wherein the first value is a selected temperature below 500° C.

4. A method according to claim 1, further comprising, when the temperature determined has reached the second value and control of the engine has changed to the second regeneration mode, controlling the engine according to the second regeneration mode until the temperature determined decreases to the first value, whereupon control of the engine changes to the first regeneration mode.

5. A method according to claim 4, further comprising altering the first and/or second values on the basis of a current engine load.

6. A method according to claim 1, further comprising:
when the temperature determined has reached the second value and control of the engine has changed to the second regeneration mode, controlling the engine according to the second regeneration mode for a first period of time, and after the first period, controlling the engine according to the first regeneration mode.

7. A method according to claim 6, further comprising alternating between the first regeneration mode and the second regeneration mode until at least one of the particle filter has been regenerated to a target soot level and the regeneration is discontinued.

8. A method according to claim 7, wherein the particle filter is judged to have been regenerated to the target soot level when a differential pressure across the filter has dropped to a predetermined target level.

9. A method according to claim 1, wherein in the first regeneration mode the engine is controlled to achieve a substantially maximized exhaust temperature.

10. A method according to claim 1, wherein in the first regeneration mode, efficiency of the engine is lowered to a lower level at which a larger proportion of energy generated by the engine changes to heat.

11. A method according to claim 1, further comprising at least in the first regeneration mode, increasing a load upon the combustion engine by increasing at least one of: a pumping work $M_{gas}$, and a braking torque $M_{agg}$ generated by ancillaries included in a vehicle that includes the combustion engine.

12. A method according to claim 1, wherein in the second regeneration mode, generating at least 50% higher content of nitrogen oxides than in the first regeneration mode.

13. A method according to claim 1, wherein the temperature is determined by a temperature sensor, and
further comprising determining a second temperature by a second temperature sensor situated in or near the particle filter, the second temperature sensor being distinct from and positioned remote from the first temperature sensor.

14. A method according to claim 1, further comprising determining the first and second selected temperature values by a temperature sensor situated in the engine exhaust flow, in conjunction with a model of the exhaust treatment.

15. A method according to claim 1, wherein the engine includes one or more pistons, and in the first regeneration mode, fuel is injected at least partly after the piston in the engine has passed a top dead center.

16. A method according to claim 1, wherein in the first regeneration mode, injecting fuel at a later time and/or at an injection angle during combustion in the engine than during injection of fuel according to the second regeneration mode.

17. A method according to claim 1, wherein the regeneration method is performed for $NO_2$ based regeneration of the particle filter.

18. A system for regeneration of a particle filter for a combustion process, wherein the filter is configured and operable to treat exhaust gases arising from combustion in a combustion engine, and wherein the system is configured and operable to control the engine according to at least a first regeneration mode and a second regeneration mode,
the system comprising:
a temperature sensor configured and operable for determining a temperature of the particle filter; and
a control device configured for determining that an active regeneration operation is necessary for the particle filter based on a soot level in the particle filter reaching a predetermined level;
wherein the control device executes the active regeneration operation when the soot level reaches the predetermined level;
wherein the active regeneration operation comprises controlling the engine to operate in the first regeneration mode when the temperature determined is below a first value, whereby the engine is controlled to generate a high exhaust temperature until the temperature of the particle filter determined reaches a second value which is higher than said first value, whereupon when the temperature of the particle filter is determined to have reached the second value, the engine is controlled to change to the second regeneration mode whereby the engine is controlled according to the second regeneration mode such that a substantially larger amount of nitrogen oxides is delivered in the exhaust from the engine than in the first regeneration mode.

19. A system according to claim 18, further comprising an oxidation catalyst situated upstream of the particle filter in the flow of exhaust gases from the engine.

20. A vehicle comprising the system according to claim 18.

* * * * *